(12) United States Patent
Eldering et al.

(10) Patent No.: US 6,704,930 B1
(45) Date of Patent: Mar. 9, 2004

(54) ADVERTISEMENT INSERTION TECHNIQUES FOR DIGITAL VIDEO STREAMS

(75) Inventors: Charles A. Eldering, Doylestown, PA (US); Gregory C. Flickinger, Horsham, PA (US); Jeffrey S. Hamilton, Doylestown, PA (US)

(73) Assignee: Expanse Networks, Inc., Pipersville, PA (US)

( * ) Notice: Subject to any disclaimer, the term of this patent is extended or adjusted under 35 U.S.C. 154(b) by 0 days.

(21) Appl. No.: 09/553,099

(22) Filed: Apr. 20, 2000

Related U.S. Application Data
(60) Provisional application No. 60/183,411, filed on Feb. 18, 2000, and provisional application No. 60/130,102, filed on Apr. 20, 1999.

(51) Int. Cl.[7] .............................. H04N 7/10; H04N 7/173
(52) U.S. Cl. .............................. 725/36; 725/32; 725/34; 725/35; 725/95; 348/385.1
(58) Field of Search .............................. 725/36, 34, 35, 725/33, 95, 63, 42, 93; 348/385.1, 387.1

(56) References Cited

U.S. PATENT DOCUMENTS

| | | | |
|---|---|---|---|
| 5,515,098 A | 5/1996 | Carles | 348/8 |
| 5,534,944 A | 7/1996 | Egawa et al. | 348/584 |
| 5,600,364 A | 2/1997 | Hendricks et al. | 348/1 |
| 5,600,366 A | * 2/1997 | Schulman | 725/36 |
| 5,774,170 A | 6/1998 | Hite et al. | 348/9 |

(List continued on next page.)

FOREIGN PATENT DOCUMENTS

| | | |
|---|---|---|
| WO | 9707565 | 2/1997 |
| WO | 9712486 | 4/1997 |
| WO | 9828906 | 7/1998 |
| WO | 9901984 | 1/1999 |
| WO | 9904561 | 1/1999 |
| WO | 9911065 | 3/1999 |
| WO | 9952283 | 10/1999 |
| WO | 9952285 | 10/1999 |
| WO | 0014951 | 3/2000 |
| WO | 0033224 | 6/2000 |
| WO | 0054504 | 9/2000 |

OTHER PUBLICATIONS

SCTE Digital Video Subcommittee, Digital Program Insertion Ad Hoc Group, *Business and Operational Dependencies*, Nov. 5, 1997, 2 pages.
SCTE Digital Video Subcommittee, *Digital Program Insertion Comments from CableLabs*, Sep. 18, 1997, 2 pages.
Davis, Joe Digital Video Systems, New Media Division, *Recommendations for New Ad Hoc Group*, Sep. 16, 1997, 4 pages.
SCTE Digital Video Subcommittee, *Digital Program Insertion Requirements*, Mar. 17, 1997, 1 page.
Digital Video Systems, *Technical Issues* Nov. 5, 1997, 5 pages.
Shen, Paul Imedia Corporation, *Imedia CherryPicker™, Router Re–Multiplexer™ for Digital Programming* Jun., 1998, 12 pages.

Primary Examiner—John Miller
Assistant Examiner—Johnny Ma
(74) Attorney, Agent, or Firm—Douglas J Ryder, Esq.; Ryder IP Law, PC

(57) ABSTRACT

A method and apparatus for the insertion and transport of advertisements in a digital environment, including methods for directing advertisements (ads) at subscribers and substituting advertisements in a program stream with targeted advertisements. The insertion methods are based on synchronous, plesiochronous, or asynchronous techniques. These methods may operate at constant bit rates or at available bit rates. An ad manager is used to select targeted advertisements, and dynamic ad linking is used to substitute an advertisement in a program stream with an alternative targeted advertisement.

33 Claims, 11 Drawing Sheets

| METHOD | BW ALLOCATION |
|---|---|
| SYNCHRONOUS CBR | EACH PROGRAM FORCED TO CBR |
| PLEISOCHRONOUS CBR | PROGRAMS FORCED TO CBR AT AD TIME |
| ASYNCHRONOUS CBR | PROGRAMS FORCED TO CBR AT AD TIME |
| SYNCHRONOUS ABR | AD BANDWIDTH MATCHES PROGRAM BANDWIDTH |
| PLEISOCHRONOUS ABR | AD BANDWIDTH MATCHES PROGRAM BANDWIDTH |
| ASYNCHRONOUS ABR | AD BANDWIDTH MATCHES PROGRAM BANDWIDTH |

U.S. PATENT DOCUMENTS

| | | | |
|---|---|---|---|
| 5,859,660 A | | 1/1999 | Perkins et al. .................. 348/9 |
| 5,861,919 A | * | 1/1999 | Perkins et al. ........... 348/385.1 |
| 5,917,830 A | | 6/1999 | Chen et al. .................. 370/487 |
| 5,974,396 A | | 10/1999 | Anderson et al. ............. 705/10 |
| 6,020,883 A | | 2/2000 | Herz et al. .................. 345/327 |
| 6,026,232 A | | 2/2000 | Yogeshwar et al. .......... 395/615 |
| 6,029,045 A | * | 2/2000 | Picco et al. ................... 725/34 |
| 6,088,000 A | | 7/2000 | Ho .............................. 348/845 |
| 6,088,722 A | | 7/2000 | Herz et al. .................. 709/217 |
| 6,108,637 A | | 8/2000 | Blumenau ...................... 705/7 |
| 6,137,834 A | * | 10/2000 | Wine et al. .................. 375/240 |
| 6,141,358 A | | 10/2000 | Hurst, Jr. et al. ............ 370/543 |
| 6,177,931 B1 | | 1/2001 | Alexander et al. ........... 345/327 |
| 6,181,383 B1 | | 1/2001 | Fox et al. .................... 348/515 |
| 6,240,103 B1 | * | 5/2001 | Schoenblum et al. ........ 370/468 |
| 6,370,199 B1 | * | 4/2002 | Bock et al. ............. 375/240.28 |
| 6,487,721 B1 | * | 11/2002 | Safadi .......................... 725/36 |
| 6,665,872 B1 | * | 12/2003 | Krishnamurthy et al. ...... 725/95 |

* cited by examiner

| METHOD | BW ALLOCATION |
|---|---|
| SYNCHRONOUS CBR | EACH PROGRAM FORCED TO CBR |
| PLEISOCHRONOUS CBR | PROGRAMS FORCED TO CBR AT AD TIME |
| ASYNCHRONOUS CBR | PROGRAMS FORCED TO CBR AT AD TIME |
| SYNCHRONOUS ABR | AD BANDWIDTH MATCHES PROGRAM BANDWIDTH |
| PLEISOCHRONOUS ABR | AD BANDWIDTH MATCHES PROGRAM BANDWIDTH |
| ASYNCHRONOUS ABR | AD BANDWIDTH MATCHES PROGRAM BANDWIDTH |

*FIG. 6*

| PROGRAM STREAM | AD STREAM |
|---|---|
| PROGRAM 1 | AD 1 |
| PROGRAM 2 | AD 2 |
| PROGRAM 3 | AD 3 |
| PROGRAM 4 | AD 4 |
| ⋮ | ⋮ |
| PROGRAM 7 | AD 7 |

*FIG. 7A (PRIOR ART)*

| PROGRAM STREAM | AD STREAM |
|---|---|
| PROGRAM 1 | AD 3 |
| PROGRAM 2 | AD 7 |
| PROGRAM 3 | AD 2 |
| PROGRAM 4 | AD 5 |
| ⋮ | ⋮ |
| PROGRAM 7 | AD 1 |

*FIG. 7B*

ADVERTISEMENT INSERTION TECHNIQUES FOR DIGITAL VIDEO STREAMS

This application claims the priority, under 35 U.S.C. §119(e), of U.S. Provisional Applications No. 60/130,102 filed on Apr. 20, 1999 and U.S. Ser. No. 60/183,411 filed on Feb. 18, 2000. Both of these applications are herein incorporated by reference but are not admitted to be prior art.

BACKGROUND OF THE INVENTION

Advertising forms an important part of broadcast programming including broadcast video (television), radio and printed media. Payments for advertising subsidize and in some cases pay entirely for programming received by subscribers. As an example, over the air broadcast programming is provided entirely free to viewers and is essentially paid for by the advertisements placed in the shows that are watched. Even in cable television systems and satellite-based systems, the advertisements subsidize the cost of the programming and were it not for advertisements, the monthly subscription rates for the cable television would be many times higher than at present. Radio similarly offers free programming based on payments received from advertising. The low cost of newspapers and magazines is based on the subsidization of the cost of reporting, printing and distribution from the advertising revenues.

The ability to transmit information including programming and advertisements digitally allows programming and advertisements to be transported from various geographic locations and arranged in a fashion which permits an optimized program to be presented to a subscriber. Although the advent of the digital age and the Internet permits advertisements to be specifically targeted at subscribers, there are numerous difficulties in creating an infrastructure, system, and methods for delivering these targeted advertisements.

Unlike traditional video systems that offer the ability to insert ads based on technologies that identify the appropriate point of insertion in an analog video signal, insert an analog advertisement, and return to the video programming at the appropriate moment, digital video systems which are being deployed lack the ability to randomly interrupt the digitally compressed Motion Picture Expert Group (MPEG) stream, insert a random digital advertisement, and return to the video programming.

Thus, it is desirable to offer enhanced services in the digital programming stream as well as to preserve the integrity of the digital programming stream. What is required is a method and apparatus for determining the ability to insert the advertisements, managing the insertion process, inserting the advertisement into the video stream, and returning to the program.

SUMMARY OF THE INVENTION

The present invention is a method and apparatus for the insertion and transport of advertisements in a digital environment, including methods for directing advertisements (ads) at subscribers and substituting advertisements in a program stream with targeted advertisements.

In one embodiment, a method of synchronous ad insertion is presented in which ads are simultaneously placed in a digital video stream. The synchronous insertion method may be implemented using constant bit rate (CBR) or available bit rate (ABR) techniques. In another embodiment, a plesiochronous method is presented in which ads are inserted within a timing window. CBR or ABR techniques may also be used in the plesiochronous ad insertion method. In another embodiment, an asynchronous ad insertion method is presented in which an ad may be asynchronously inserted in a video stream.

An in-band channel may be used for the transport of advertisements. The in-band channel delivers the advertisements in real-time at the moment of insertion, and the ads are not pre-stored in any storage medium. In an alternative embodiment, the ads are received in an out-of-band channel and are stored in a storage medium for subsequent insertion into the program stream.

The present invention may also be used to monitor the program bandwidth and determine if an ad may be placed in that bandwidth. Generally, the ads are received in a high resolution state with minimum compression, and are compressed to a predetermined ABR bandwidth at the time of insertion.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 6 illustrates a tabular summary of the various methods of ad insertion;

FIGS. 7A and 7B illustrate a method of dynamically assigning advertisements within a multiplexed stream;

DETAILED DESCRIPTION OF THE PREFERRED EMBODIMENT

Figure 1:
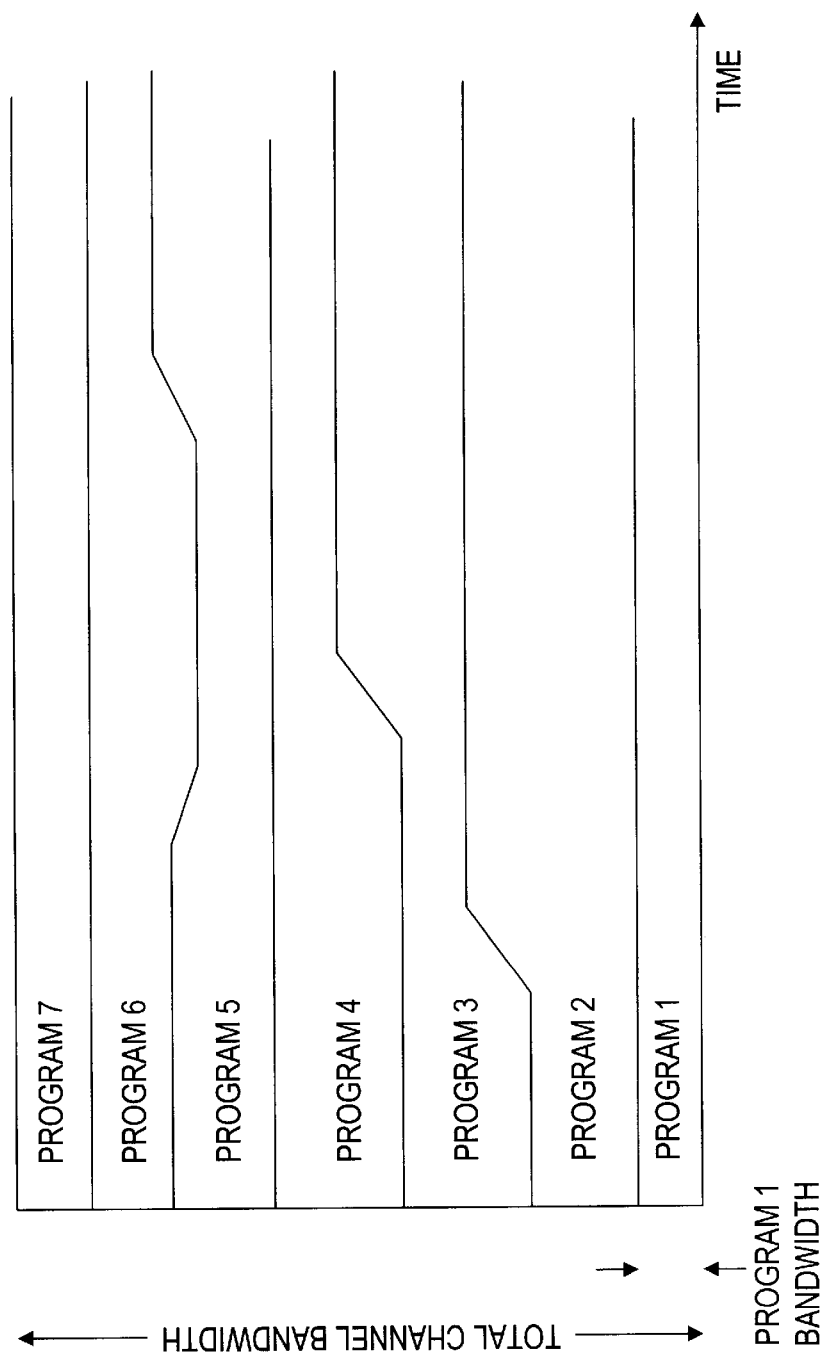
FIG. 1 illustrates a multiplexed stream containing multiple program streams.

In describing a preferred embodiment of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

With reference to the drawings, in general, and FIGS. 1 through 11 in particular, the method and system of the present invention is disclosed.

As shown in FIG. 1, video programs may be multiplexed into one or more channels. Many different methods or standards may be used to perform multiplexing operations. One such standard is the motion pictures expert group (MPEG) standard for digital video programming. The MPEG standard permits the use of statistical multiplexing to multiplex digital signals into a single channel (multiplexed stream) wherein the bandwidth allocated to each of the individual program varies over time. This is illustrated in FIG. 1 wherein several of the digital program streams, labeled as programs 2, 3, 4, 5, and 6, are allocated bandwidth within the multiplexed stream which varies over time. This feature of the MPEG standard allows bandwidth to be allocated according to the requirements of the program contents, e.g., the programming which has more motion or changes in scenery is allocated substantially more bandwidth within the multiplexed stream than the programming with passive scenes.

There exists similar digital video streaming techniques that utilize statistical multiplexing and permit the amount of bandwidth allocated to a program stream to be varied. These techniques are not limited to video, but can be equally applied to digital audio and multimedia. These schemes generally include Transmission Control Protocol/Internet Protocol (TCP/IP) protocols and applications such as those produced by Progressive Networks and sold under the trademarks REAL AUDIO and REAL VIDEO, which is presently used to transmit broadcast and recorded audio and video across the Internet. Methods of audio and video compression and digital transport are well known to those skilled in the art.

Although the use of statistical multiplexing techniques is predominant in the area of video transmission, such multiplexing techniques can also be utilized for the transmission of audio and data services. With the advent of the Internet, programming can be gathered from multiple sources and assembled into broadcast type channels. This programming can consist of both prerecorded and live broadcast and may contain video, audio, and text or combinations of these signals. In the case of digital video, the total channel bandwidth used and the number of program streams carried within that bandwidth is dependent upon the particular medium and transport system. For example, in a cable television (CATV) system, digital video signals are multiplexed into a 27 Mbps data stream, which is modulated onto a carrier typically in the range of 50 to 750 MHz using 64 Quadrature Amplitude Modulation (QAM). The resulting signal is 6 MHz wide, and is compatible with the existing analog signals.

As illustrated in FIG. 1, the bandwidth allocated to the program streams within the multiplexed stream also depends upon the program contents. For example, a football game is generally allocated substantially more bandwidth than a program that contains primarily passive scenes such as a talk show. MPEG multiplexers used in CATV systems are generally configured to evaluate the program contents associated with various program streams and then determine, based on the program contents, how to dynamically allocate the bandwidth among different program streams.

Satellite systems also use similar multiplexing techniques, and the statistical multiplexing of the video frequently begins at the satellite uplink transmission that contains a number of programs multiplexed into a 27 Mbps stream.

Broadcast systems also use 6 MHz channels and are migrating to a digital transport system. Similar MPEG multiplexing techniques are used to deliver multiple channels within one 6 MHz bandwidth, however the data stream is not based on 27 Mbps.

The standards have also been developed for the transmission of high-definition television (HDTV) signals. In the HDTV systems, a number of high definition channels can be transmitted in one multiplexed stream. Because of the higher bandwidth requirements, the number of channels transmitted in a single multiplexed stream is typically limited to two to four programs. Emerging HDTV systems also utilize a 6 MHz channel to carry the multiplexed stream.

Lately, switched digital video (SDV) systems have also been developed in which the user selections are transmitted to a central switching device, and only the programs being viewed are transmitted to the subscriber. These systems are generally based on Fiber-to-the-Curb (FTTC), Fiber-to-the-Home (FTTH), or a number of digital subscriber line systems referred to as xDSL systems. In FTTC, FTTH and xDSL systems, the number of channels simultaneously transmitted to the home is typically lower than the number of channels contained in a cable television multiplexed stream. In a typical xDSL video system, two or three video programs may be simultaneously delivered to a home over twisted wire pairs at a data rate in the range of 10 to 25 Mbps. These programs may or may not be statistically multiplexed.

Figure 2:
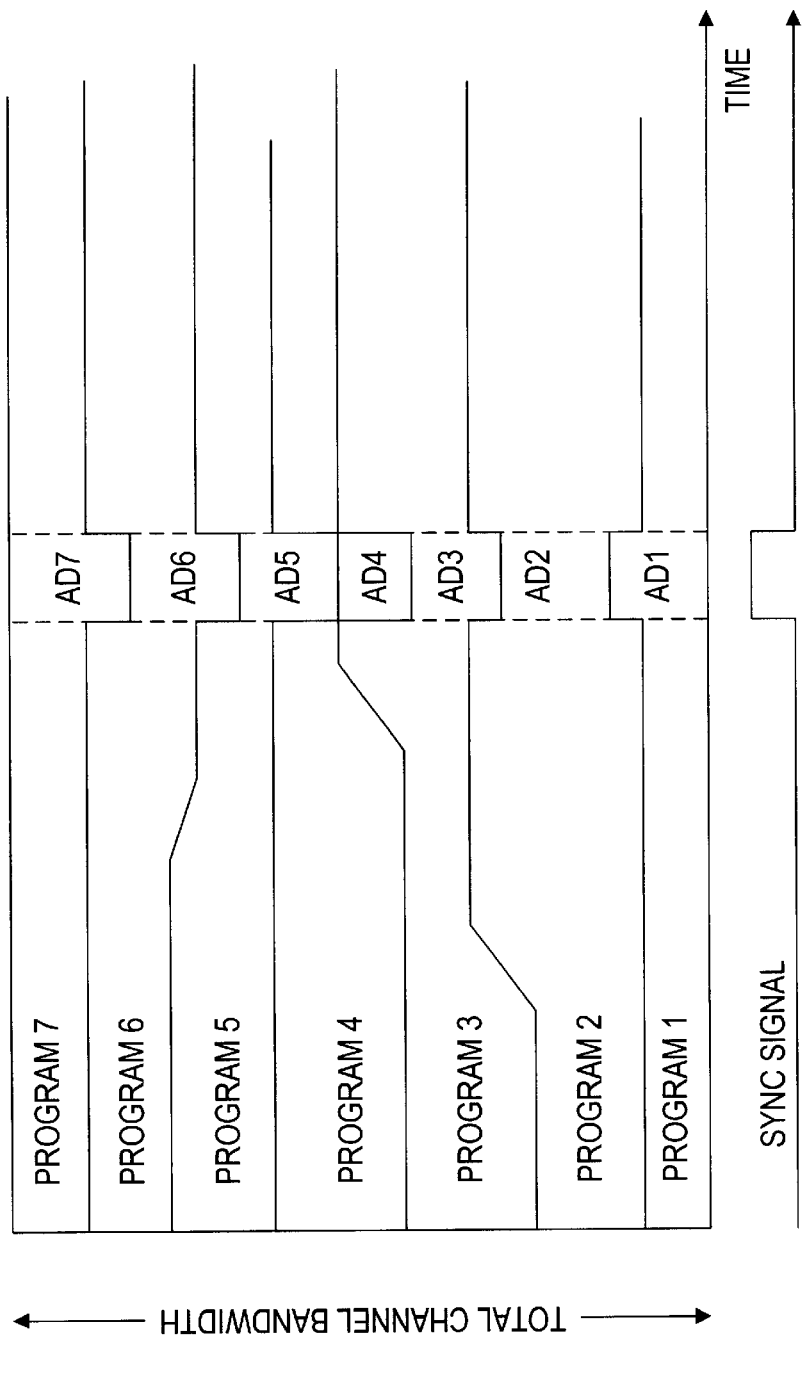
FIG. 2 illustrates a statistically multiplexed stream in which ads are inserted synchronously at a constant bit rate (CBR)

FIG. 2 illustrates a method of synchronous insertion of ads into program streams. As shown in FIG. 2, multiple program streams are interrupted for the presentation of one or more advertisements. In FIG. 2, the advertisements are represented by the designations AD1, AD2, AD3 . . . AD7. When used herein the term advertisement refers to a singular advertisement or a sequence of advertisements to be inserted into a program stream.

The method illustrated is a synchronous constant bit rate (CBR) ad insertion. In this method, each advertisement to be inserted has an equal bandwidth and a sync signal is used to indicate the appropriate point for insertion of each advertisement. Each program stream is simultaneously interrupted and the bit rate of each program stream is set to a bit rate appropriate for the advertisements. Thus, it is necessary for the program stream to adapt its bandwidth at the time of the ad insertion. In addition, each of the program segments within the program (e.g., advertising breaks) must be of the same length. For example, if MPEG multiplexers are used, these multiplexers must be able to accommodate the rapid changes in bandwidth allocations to allow insertion of all advertisements.

Figure 3:
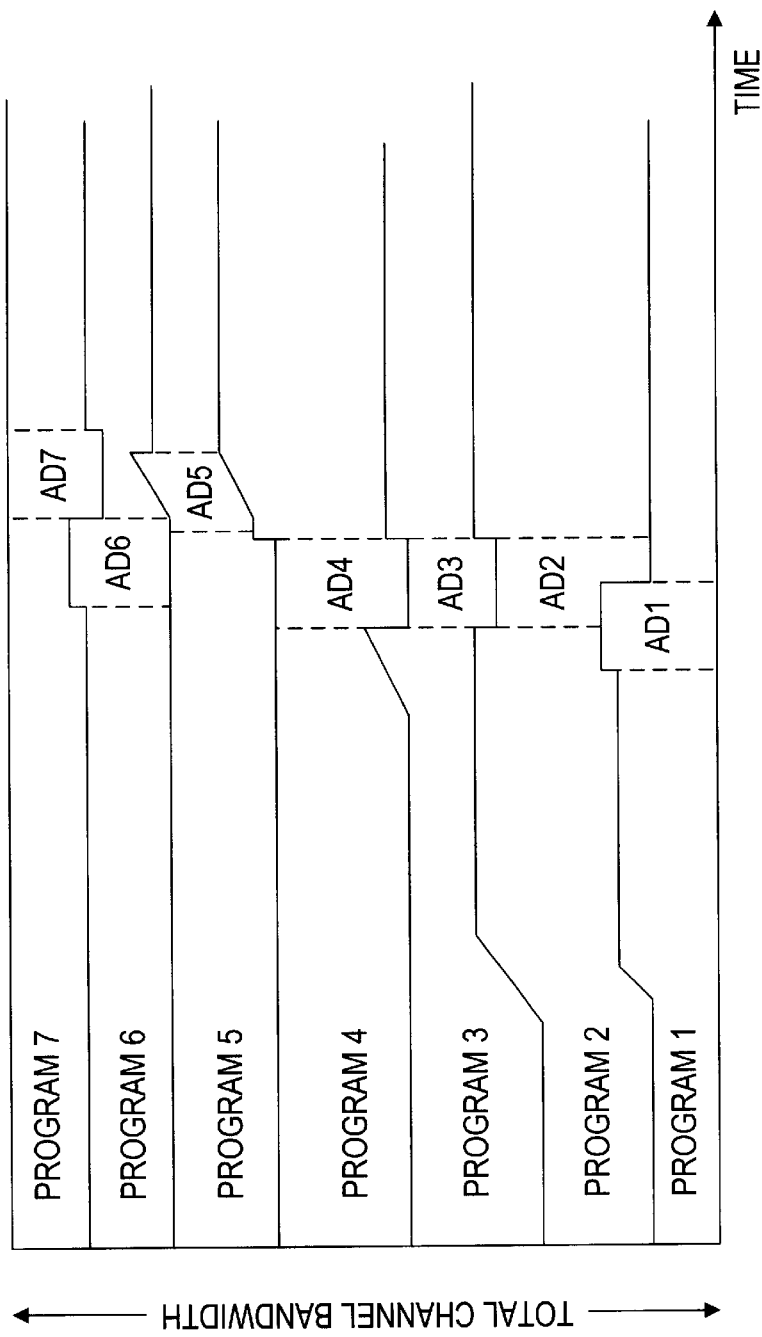
FIG. 3 illustrates a statistically multiplexed stream in which ads are inserted in a plesiochronous manner.

FIG. 3 illustrates a method of plesiochronous insertion of advertisements in the program streams. In this method, the program streams are interrupted and the bandwidth of each program stream is changed to a CBR before the actual insertion of the advertisements. In the plesiochronous method, the advertisements are not completely synchronized and are inserted within a predetermined window (period of time). The plesiochronous insertion method does not require the program segments to be of equal lengths, however, the program segments should be of similar lengths.

Both synchronous and plesiochronous ad insertion methods may be adapted to use an available bit rate (ABR) technique. When used herein, the term ABR refers to the transmission of an advertisement at a bit rate which is compatible with an existing program stream.

Figure 4:
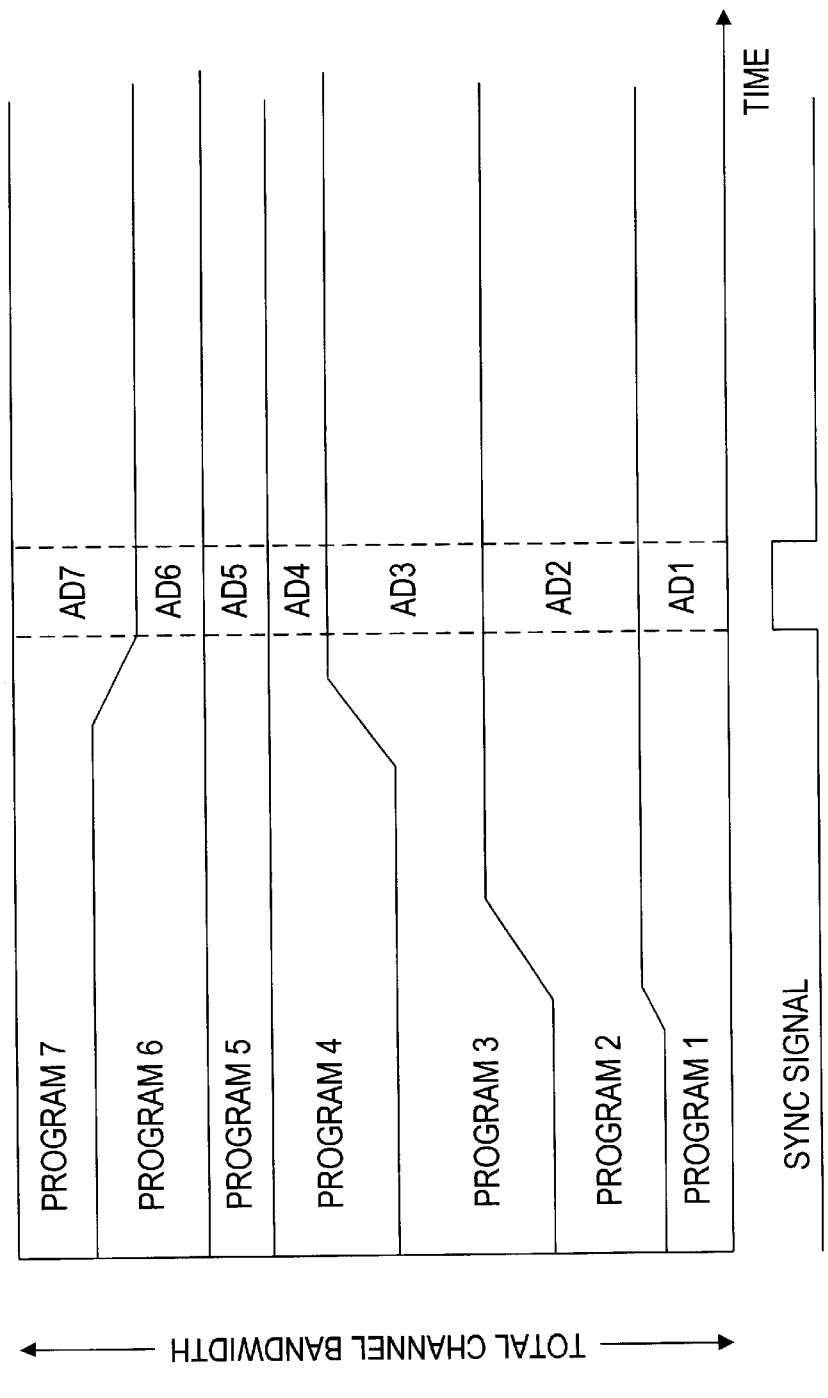
FIG. 4 illustrates a statistically multiplexed stream in which ads are synchronously inserted at an available bit rate (ABR)

In the synchronous ABR method, the process of ad insertion is synchronized, but the bandwidths of the program streams are not adjusted for the advertisements. Instead, the advertising material is compressed to a level identical to that of the programming. FIG. 4 illustrates the insertion of advertisements using the ABR technique. As shown in FIG. 4, a synchronization signal is generally used to synchronize the program streams and select a synchronized time for the insertion of the advertisements.

Figure 5:
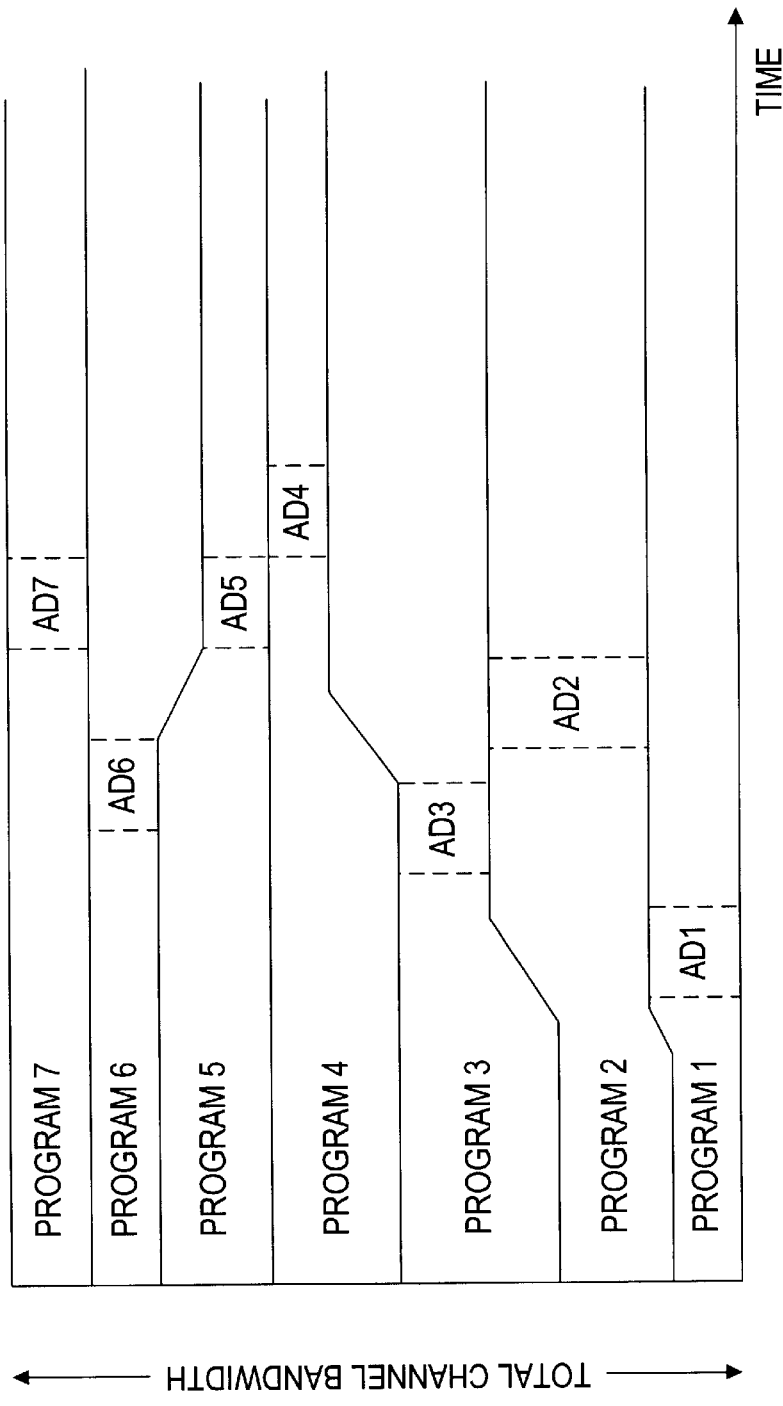
FIG. 5 illustrates a statistically multiplexed stream in which ads are asynchronously inserted at an ABR.

FIG. 5 illustrates an asynchronous ad insertion method wherein the ads are inserted at a time appropriately selected rather than at a synchronized time. The advantage of this technique is that the program segments and the insertion time can be created according to the producer's desires or according to a variety of pre-determined production parameters. For example, the producers of a program stream may determine suitable points within the program contents for ad insertions and forward the information on these points to the ad insertion systems.

The asynchronous ad insertion method may be used either with the ABR technique or with the CBR technique. For exemplary purposes, FIG. 5 illustrates a case of asynchronous ad insertion method based on the use of the ABR technique. In this exemplary case, the bandwidth of the advertisements is made equal to that of the actual programming before the actual insertion.

FIG. 6 illustrates, in a tabular format, a summary of the methods that can be used for ad insertion in accordance with the principles of the present invention. The table of FIG. 6 also illustrates the corresponding bandwidth allocation requirements for each method. As can be seen from the table in FIG. 6, the synchronous CBR method requires that each program stream be adjusted to a predetermined constant bit rate and that there must be a synchronization between each advertisement.

The plesiochronous CBR method requires that each program stream is set to a CBR at the time of the ad insertion. This method allows some flexibility in the bandwidth allocation depending on the timing of the insertion of the ad. For example, the ad insertion time may be adjusted slightly to permit an optimal utilization of the available bandwidth. Another feature of this method is that if one or more of the program streams cannot accommodate a reduction in the utilized bandwidth, the insertion of the ad can be delayed (within the time window) until the required bandwidth is available.

In the asynchronous CBR method, the program streams are adjusted to the CBR at insertion time, however, the insertion time is not restricted to occur at a specific time. Instead, the asynchronous CBR technique allows the ad to be inserted at a time mostly suited to meet the programming needs.

The synchronous ABR method requires that the bandwidth of the advertisements be matched to the program bandwidth. Thus, some of the advertisements cannot be inserted into a particular program stream. For example, a low bandwidth signal, such as that associated with a talk show, may not have the bandwidth required for a high bandwidth advertisement. In the plesiochronous ABR method, the bandwidth of the advertisement is matched to the program bandwidth. In the asynchronous ABR method, the bandwidth of the advertisement matches a program bandwidth, however the actual ad insertion occurs at a time set appropriately by the producers of the program. This time may also be selected based on the bandwidth requirements, e.g., at a moment of appropriate bandwidth.

The present invention also encompasses the principles of dynamic ad linking wherein the advertisements from one or more advertisements not initially associated with a program stream can be inserted into that program stream for viewing by the subscriber. In prior art, generally, each advertisement has a predetermined corresponding program stream. Herein the advertisements do not have pre-assigned program streams, and instead are dynamically linked.

FIG. 7A illustrates a prior art method of pre-assigned advertisements with a plurality of program streams. As illustrated in FIG. 7A, AD1 is associated with the first program stream, and AD2 is associated with the second program stream. Similarly, the remaining advertisements are assigned in a sequential manner, e.g., AD3 to program stream 3, AD4 to program stream 4, etc.

FIG. 7B illustrates a method of dynamic ad linking process in accordance with the principles of the present invention. In the dynamic ad linking process, the advertisements do not have preassigned program streams, and the advertisements are assigned to various program streams based on one or more different parameters. These parameters may be pre-set by producers, programmers or cable operators. One or more advertisements not initially associated with a program stream can be inserted into that program stream for viewing by the subscriber. Furthermore, the advertisements from different advertising streams may be associated with different program streams. As illustrated in FIG. 7B, the program stream 1 can have one or more ads labeled as AD3 inserted into the program stream. Similarly ad stream AD7 is dynamically associated with the program stream 2. The advantage of the dynamic linking technique is that ads contained with a multiplexed stream can be appropriately selected and targeted at different viewers. Advertisements are no longer limited to the initially assigned program streams.

The dynamic linking technique may be employed in a CATV system in which a number of program streams are multiplexed into one 27 Mbps data stream. The ads may be dynamically linked to the program streams simply by re-addressing one or more identifiers associated with the advertisements. For synchronous systems, the dynamic linking occurs at the commencement of the advertisement, wherein an ad, corresponding to a first program stream is inserted into another program stream. As an example, a viewer of program stream 1 can have an ad labeled as AD7 directed at the time of commencement of the advertisement.

The dynamic linking technique may also be applied in the plesiochronous ad insertion method. Because of the plesiochronous nature, the dynamic linking in this method typically requires a storage memory. This storage memory may be resident in the television set-top or in a computer. The memory temporarily stores the contents of the advertisement that may be displayed at a later time. Generally, the ad insertion is delayed until all of the advertising material has been received at which point the dynamic linking occurs.

In accordance with the principles of the present invention, a dedicated ad channel may be contained within a multiplexed stream to transport the selected advertisements. For example, one or more channels that would have contained broadcast programming now contain a stream of advertisements. These ads may be inserted in real time. Alternatively, these ads can be locally stored and subsequently displayed at the appropriate ad insertion time.

Figure 8:
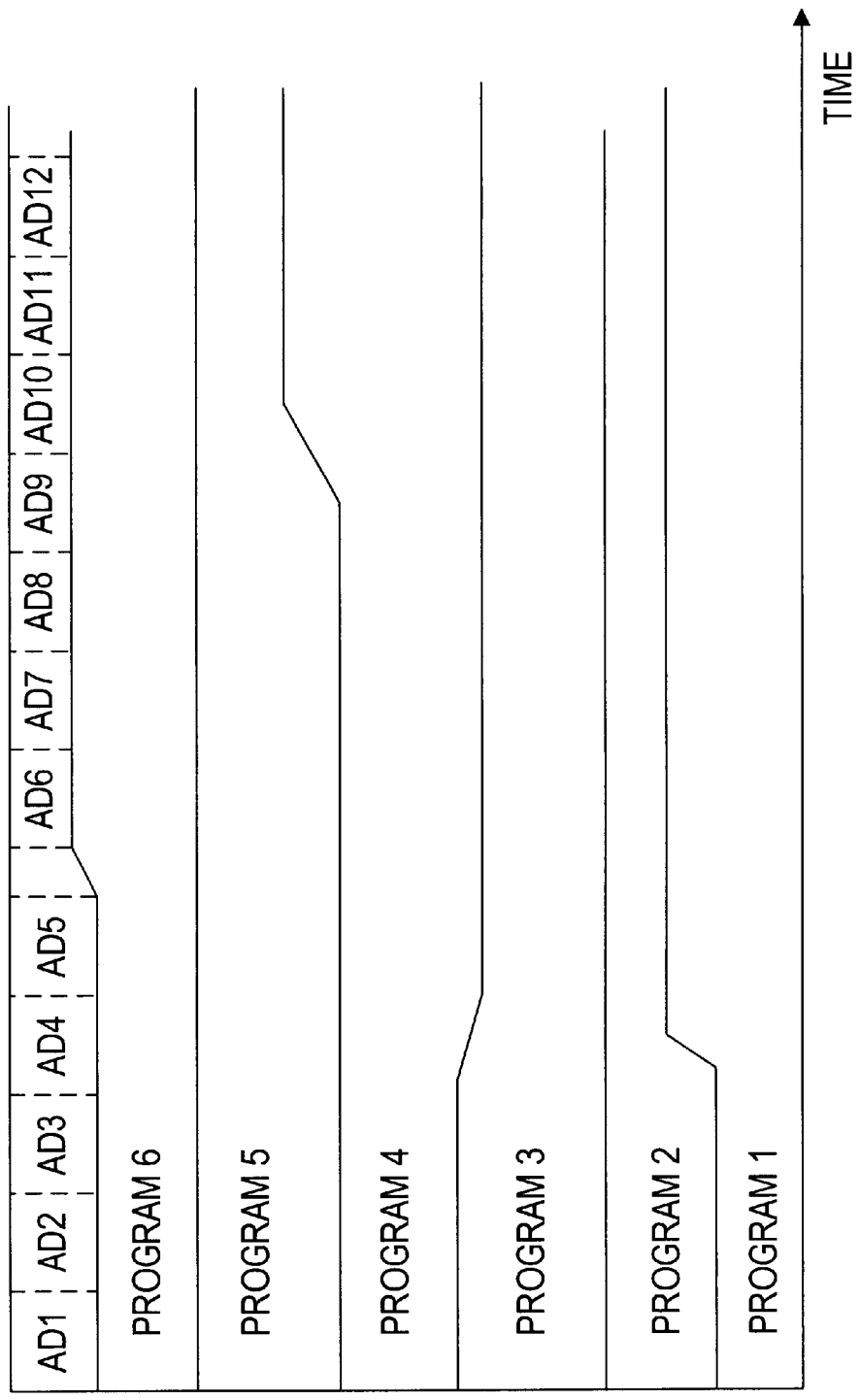
FIG. 8 illustrates the use of an in-hand channel to transport advertisements.

FIG. 8 illustrates an exemplary case of the use of an in-band ad channel to transport advertisements. The in-band ad channel is at the same frequency as the other program streams and is multiplexed within the primary multiplexed stream. In this case, the in-band ad channel is treated in a same manner as the primary multiplexed stream. Although the ad insertion time is not illustrated in FIG. 8, it is understood that the program streams may be interrupted for advertisements at a particular time and that an advertisement from the illustrated ad channel can be retrieved and displayed at the appropriate time to the viewer.

The ad channel technique illustrated in FIG. 8 can be applied to a number of transport technologies and is not limited to CATV systems. The ad channel may be created as part of a broadcast or SDV system containing multiple digital streams.

Figure 9:
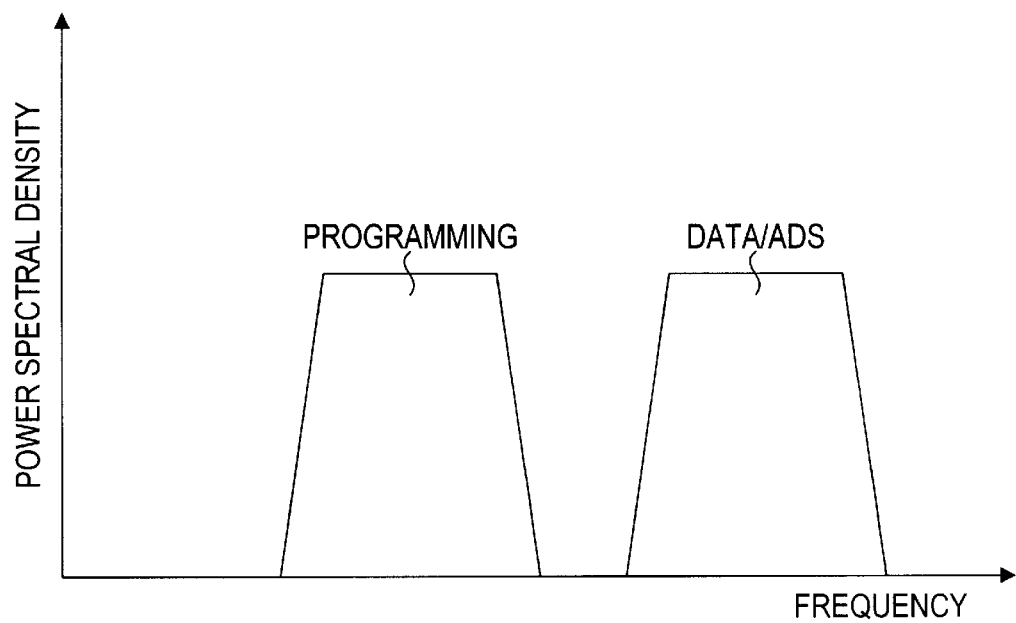
FIG. 9 illustrates the use of an out-of-hand channel (separate from the programming channel) to transport advertisements.

FIG. 9 illustrates the use of a frequency distinct or an out-of-band channel to transport advertisements. Herein, the advertisements are transmitted at a frequency which is distinct from that of the frequency carrying the actual programming. As an example, the actual program streams may be transmitted in a CATV system in the first 6 MHz channel of the 50 to 750 MHz range, while the advertisements may be transmitted on a second channel in the same frequency range. In this case, the advertisements are received in an ad channel, which is similar to that illustrated in FIG. 8, but the ad channel is not contained within the multiplexed program stream. One advantage of this embodiment is that the advertisements are carried in a separate channel and the programming streams remain untouched.

Both embodiments as illustrated in FIG. 8 and FIG. 9 are easily implemented with the use of current technologies. In CATV systems, generally, a CATV set-top contains a modem, such as a Data Over Cable System Interface Specification (DOCSIS) modem that is able to receive data and advertisements simultaneously. Thus, in accordance with the principles of the present invention, subscribers who have modems in their set-tops can receive actual programming and dynamically linked advertisements simultaneously.

In a SDV system, the data/ad channel can be an asynchronous transfer mode (ATM) virtual path indicator/virtual channel indicator (VPI/VCI) channel or a TCP/IP connection, which is separate from the programming itself. As in the CATV system, the program streams may contain an original set of advertisements, which can be superseded or replaced by ads from the data/ad channel. Similarly, in Internet-based environment, the advertisements may be inserted in program streams (i.e., in the streaming video streams).

In an over-the-air system, the program streams may be transmitted in standard or high-definition format in a 6 MHz channel while ads are delivered on a separate channel. Locally stored ads may also be inserted at the appropriate time in the digital stream for presentation to the subscriber. Similar techniques can be applied to radio programming delivered over the air via satellite, over cable or over the Internet.

Figure 10:
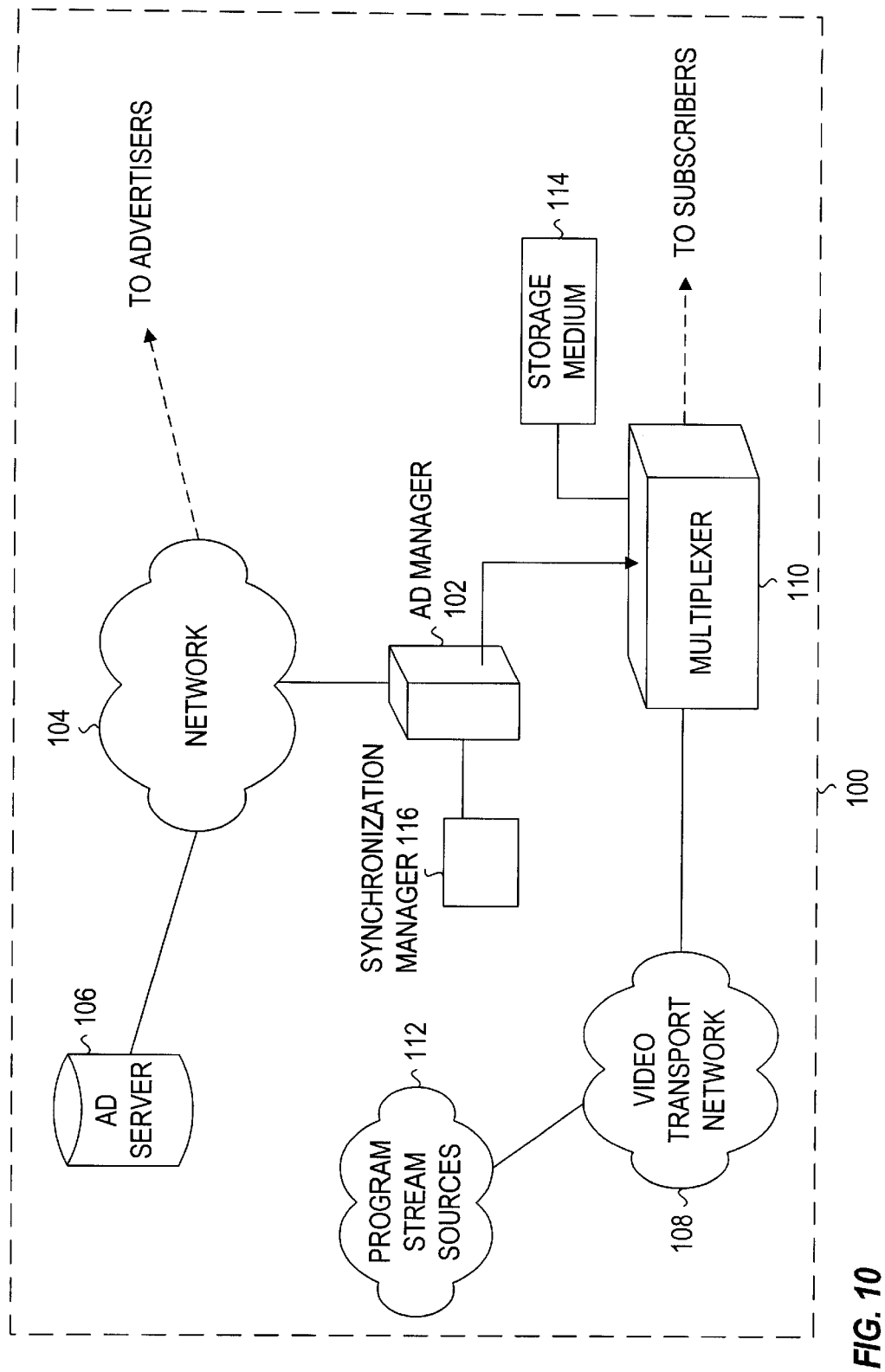
FIG. 10 illustrates an Ad Insertion System (AIS) in accordance with one embodiment of the present invention.

FIG. 10 illustrates an Ad Insertion System (AIS) 100 in accordance with one embodiment of the present invention. In this embodiment, there exists an ad manager 102 configured to manage the ad insertion process. The ad manager 102 is connected to a network 104 that allows ads to be read from one or more ad servers 106. The network 104 may be a computer network, the Internet or an Intranet. The actual ad contents may be resident on multiple ad servers 106, wherein the ad servers 106 are operated by advertisers, program producers, or content providers. In addition, a connectivity is established between the ad manager 102 and the advertisers, product producers, or content providers through the network 104 for negotiations regarding the placement of ads and contractual obligations. In the case of the Internet, traditional TCP/IP protocols are used to establish the connectivity. Other network protocols may also be used.

Generally, the advertisements are transmitted from one or more of the ad servers 106 to the ad manager 102 in a partially or fully compressed format. The ads may also be transmitted in an uncompressed or analog form. The ad sources, e.g., the ad servers 106, also transmit information regarding the advertisement, including the minimum bandwidth allowed for transmission of the advertisement and duration of the advertisement.

As illustrated in FIG. 10, the actual program streams are received from program stream sources 112, such as satellites, by video transport networks (systems) 108. Generally, the video transport network 108 receives the actual program streams from one or more sources and forwards them to a multiplexer 110. The multiplexer 110 also receives compressed ads from the ad manager 102 along with insertion information including target programming and time for insertion. The multiplexer 110 is responsible for multiplexing ads and the actual program streams, and, thereon, the multiplexed signals (program streams) are transmitted to one or more subscribers. An indication as to which ad is appropriate for a subscriber may also be transmitted from the ad manager 102 to the multiplexer 110. This indication can be sent in real time or in advance. In a synchronous system, the indication determines which ad will be placed in the program stream that is being viewed by the subscriber.

The AIS 100 also includes a synchronization manager 116. The synchronization manager 116 provides a reference clock to the ad manager 102. The reference clock is used to maintain synchronization within the system, and in the case of the synchronous ad insertion method, provides a master synchronization signal to be used for insertion of the advertisements. In an exemplary case, the reference clock is a stratum 3 network clock.

A storage medium 114 having means for temporary storage and permanent storage is also provided. When the ads that are supplied on an in-band or out-of-band ad channel, the advertisements may be stored in storage medium 114 until the insertion time. When the adequate bandwidth for the transmission of multiple simultaneous advertisements in the in-band advertisement channel or in the out-of-band advertisement channel becomes available, the advertisements are retrieved from the storage medium 114 and are dynamically linked to the program stream being viewed by the subscriber. Similarly, in a plesiochronous system, the ads are stored in the storage medium 114 (if required), to permit insertion at a suitable later time.

Figure 11:
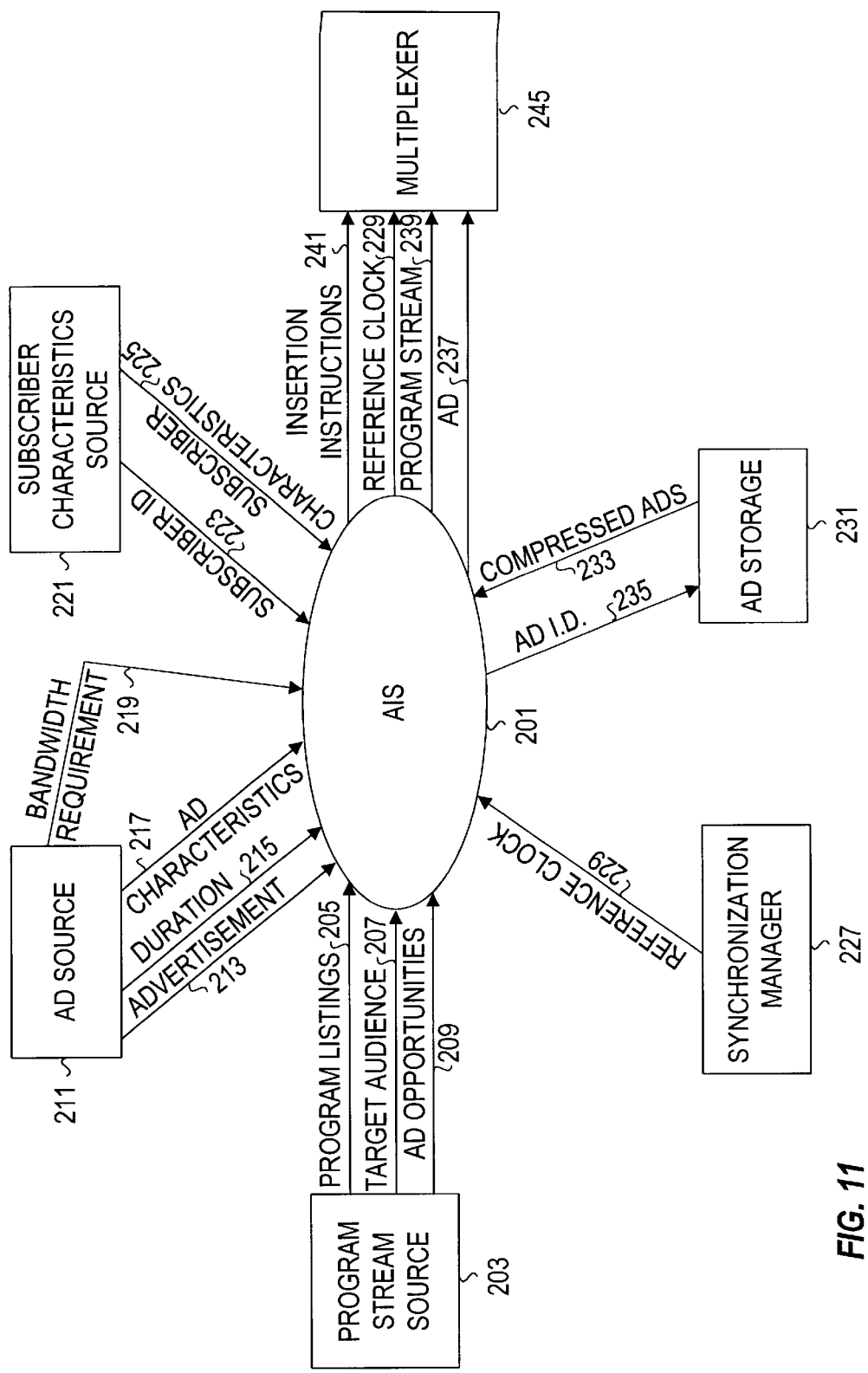
FIG. 11 illustrates a context diagram of an Ad Insertion system (AIS) in accordance with the principles of the present invention.

FIG. 11 is a context diagram illustrating the relationship between an AIS 201 and other entities. The AIS 201 is configured to receive information from a plurality of entities (sources). The AIS 201, based on the information from the different entities, also manages the ad insertion process. A program stream source 203 provides information about program listings 205, target audience 207, as well as ad opportunities (empty segments) 209 available within the program streams. Generally, such information assists the AIS 201 in obtaining some knowledge about the contents of the program streams as well as available ad opportunities within the program streams. The program stream source 203 also provides some basic information about target audiences, e.g., type of subscribers that may be interested in the program. Such determination is usually based on linked sponsorship model, e.g., a football game attracts young males, and therefore, the target audience is young males. Consequently, the beer advertisements are appropriate, etc.

An advertisement 213 is received from an ad source 211. The ad source 211 may also provide the duration 215 for the advertisement, ad characteristics 217, and bandwidth requirements 219. The ad characteristics 217 assist in obtaining more information about the advertisements, i.e., the type of advertisement, e.g., a beer ad or a gardening tool ad. The duration 215 generally relates to the length of the ad. The bandwidth requirements 219 assist in determining whether a particular advertisement can be placed in a program stream.

A subscriber characteristics source 221 provides information on subscriber identification 223 and subscriber characteristics 225. The information from the subscriber characteristics source 221 helps in determining suitable subscribers for the advertisements. Generally, the subscriber characteristics 225 are based on demographic, socio-economic, or consumption factors, or a combination of one or more factors. These characteristics define one or more features of the subscribers and therefore assist the AIS 201 in the selection of a suitable advertisement.

A synchronization manager 227 provides a reference clock 229. This reference clock 229 assists in selecting an appropriate synchronization signal for advertisement insertion. An ad storage 231 assists in the storage of advertisements. In the cases of pleosynchronous and asynchronous insertions, the advertisements are stored in the ad storage 231 until the moment of insertion. Generally, the ad storage 231 stores compressed advertisements 233 by advertisement IDs 235. At the moment of insertion, the compressed ads 233 stored in ad storage 231 are retrieved by their corresponding advertisement IDs 235.

The AIS 201, based on the information received from the ad source 211, the program stream source 203, and the subscriber characteristics source 221, determines a match between an advertisement and a program stream. The AIS 201 also selects an appropriate means and time for the insertion of the selected advertisements in the program streams.

For the insertion process, the AIS 201 forwards the selected AD 237, target program stream 239, along with insertion instructions 241 to a multiplexer 245 that combines the program streams with the selected advertisements. In the case of synchronization insertion, the AIS 201 also provides the reference clock 229 to the multiplexer 245. The multiplexer 245, based on the instruction from the AIS 201, multiplexes the program streams and advertisements to create one or more multiplexed streams.

The multiplexed program streams may be transported to the subscribers over a variety of transmission systems including CATV, satellite, wireless, xDSL, FTTC or FTTH networks. At the subscriber site, the multiplexed signals are received by appropriate subscriber equipment such as a television set-top or a personal computer. Generally, the set-top or personal computer contains hardware for the reception of signals from the network and can include multiple tuners for receiving video programming along with advertisements. One or more microprocessors and associated random access memory (RAM) can be used for storage of ads or video programming as required by the dynamic linking in plesiochronous ad insertion technique. The information required to associate the ad with the programming can be transmitted from the ad manager over the same channel used to transmit the video. As previously described, various parameters may be used to find an appropriate association between the subscriber and the advertisement, and an advertisement can be directed to the subscriber by insertion into the program the subscriber is viewing. These parameters may be based on the target markets and demographic characteristics of the subscribers.

In one embodiment, the AIS 201 is implemented on server based technology. As an example, processors provided by Intel under the trademark PENTIUM can be used in a single processor or multiple processor configuration. The operating system offered by Microsoft Corporation under the trademark WINDOWS NT SERVER can be used as the basis for the platform. The ad manager software can be realized in a number of programming languages including but not limited to Java, C, and C++. In one embodiment the portions of the system which interface to the Internet are based on Java and Java scripts.

As an example, communications with advertisers may occur by executing one or more Java scripts that exchange information between the ad manager and the advertiser, which can result in the acceptance of an ad, for placement, in a video stream. In a preferred embodiment, the operations of the ad manager, which manipulate the video, including direction to the video compressor and ad storage unit, can be realized in C.

At the subscriber side, the multiplexed program streams are received by a television, a television set-top, or a personal computer. The user equipment decodes the multiplexed program streams, and displays it on a television or a monitor. The set-top can be based on a cable receiver, including a microprocessor, and an MPEG video decompression device.

Although this invention has been illustrated by reference to specific embodiments, it will be apparent to those skilled in the art that various changes and modifications may be made, which clearly fall within the scope of the invention. The invention is intended to be protected broadly within the spirit and scope of the appended claims.

What is claimed is:

1. A method for inserting advertisements into one or more digital program streams within a multiplexed digital stream, the method comprising:

receiving a multiplexed digital stream having a plurality of digital program streams, wherein the multiplexed digital stream is allocated a multiplex bandwidth and the multiplex bandwidth is divided among the plurality of digital program streams into program bandwidths, the program bandwidth allocated based on bit rate associated with program contents, and wherein the digital program streams include advertisements opportunities;

accessing a plurality of advertisements and associated advertisement information, wherein the advertisement information includes advertisement bandwidth requirements;

selecting advertisements from the plurality of advertisements to be inserted in the digital program streams, wherein the advertisements are selected based at least in part on the program bandwidth and the advertisement bandwidth; and inserting the advertisements into the advertisement opportunities within the digital program streams.

2. The method of claim 1, wherein the advertisement opportunities within the digital program streams are in synchronization with one another.

3. The method of claim 1, wherein the advertisement opportunities within the digital program streams are plesiouchronous.

4. The method of claim 1, wherein the advertisement opportunities within the digital program streams are asynchronous.

5. The method of claim 1, wherein said selecting includes selecting advertisements where the advertising bandwidth is in close proximity to the program bandwidth.

6. The method of claim 1, wherein said selecting includes selecting advertisements having a bit rate in close proximity to bit rate of the digital program stream.

7. The method of claim 1, wherein said selecting includes selecting advertisements having a bit rate less than or equal to bit rate of the advertisement opportunity within the digital program stream.

8. The method of claim 1, further comprising compressing the advertisement so that the advertising bandwidth is in close proximity to the programming bandwidth, and wherein said compressing is done prior to said inserting.

9. The method of claim 1, further comprising modifying the program bandwidth to a predefined bandwidth prior to said inserting, wherein said inserting includes inserting the advertisement having the predefined bandwidth.

10. The method of claim 9, wherein the predefined bandwidth is a bandwidth associated with advertisements.

11. The method of claim 9, wherein the predefined bandwidth is a minimum bandwidth for advertisements.

12. The method of claim 9, wherein the predefined bandwidth is the advertisement bandwidth.

13. The method of claim 1, further comprising modifying bit rate of the digital program stream to a constant bit rate prior to said inserting, wherein said inserting includes inserting the advertisement having the constant bit rate.

14. The method of claim 13, wherein the constant bit rate is an advertisement bit rate.

15. A system for inserting advertisements into one or more digital program streams within a multiplexed digital stream, the system comprising:

a receiver to receive a multiplexed digital stream having a plurality of digital program streams, wherein the multiplexed digital stream is allocated a multiplex bandwidth and the multiplex bandwidth is divided among the plurality of digital program streams into program bandwidths, the program bandwidth allocated based on bit rate associated with program contents, and wherein the digital program streams include advertisements opportunities;

an interface to access a plurality of advertisements and associated advertisement information, wherein the advertisement information includes advertisement bandwidth requirements;

an advertisement manager to select advertisements from the plurality of advertisements to be inserted in the digital program streams, wherein the advertisements are selected based at least in part on the program bandwidth and the advertisement bandwidth; and a multiplexer to insert the advertisements.

16. The system of claim 15, further comprising an avail manager to detect the advertisement opportunities within the digital program streams.

17. A method for inserting advertisements into one or more digital program streams within a multiplexed digital stream, the method comprising:

receiving a multiplexed digital stream having a plurality of digital program streams, wherein the multiplexed digital stream has a maximum bit rate it can support and the digital program streams have a fluctuating bit rate based on program contents;

accessing a plurality of advertisements; and inserting selective ones of the advertisements into the digital program streams, wherein the bit rate of the digital program streams may be dynamically adjusted at point of insertion.

18. The method of claim 17, wherein said inserting includes inserting advertisement having a bit rate equal to or less than a bit rate of the program at a point prior to said inserting.

19. The method of claim 17, wherein said inserting includes inserting advertisements having a bit rate equal to or less than remaining bit rate available within the multiplexed digital stream.

20. The method of claim 17, further comprising determining available bandwidth within the multiplexed digital stream for an advertisement; and preventing insertion of advertisements exceeding the available bandwidth.

21. The method of claim 17, further comprising determining available bit rate within the multiplexed digital stream for an advertisement; and preventing insertion of advertisements exceeding the available bit rate.

22. The method of claim 17, further comprising determining a minimum bit rate for an advertisement; and determining available bit rate within the multiplexed digital stream for an advertisement; and selecting an advertisement for insertion that has a minimum bit rate that is less than or equal to the available bit rate.

23. The method of claim 17, further comprising adjusting the bit rate of the digital program stream to a predetermined bit rate prior to said inserting.

24. The method of claim 23, wherein the predetermined bit rate is a minimum advertisement bit rate.

25. The method of claim 23, wherein the predetermined bit rate is bit rate of the selected advertisement.

26. A system for inserting advertisements into one or more digital program streams within a multiplexed digital stream, the system comprising:

a receiver to receive a multiplexed digital stream having a plurality of digital program streams, wherein the multiplexed digital stream has a maximum bit rate it can support and the digital program streams have a fluctuating bit rate based on program contents;

an advertisement manager to access a plurality of advertisements; and a statistical multiplexer to insert selective ones of the advertisements into the digital program streams, wherein the bit rate of the digital program streams may be dynamically adjusted at point of insertion.

27. The system of claim 26, wherein the statistical multiplexer determines available bandwidth within the multiplexed digital stream for an advertisement and prevents insertion of advertisements exceeding the available bandwidth.

28. The system of claim 26, further comprising an avail manager to determine available bit rate within the multiplexed digital stream for an advertisement, wherein the advertisement manager determines a minimum bit rate for an advertisement and selects an advertisement for insertion that has a minimum bit rate that is less than or equal to the available bit rate.

29. A computer based method for controlling insertion of advertisements into a digitally multiplexed video stream, the method comprising:

receiving a digitally multiplexed video signal containing a plurality of digital program streams, wherein the program streams have a time varying bit rate and at least one advertisement insertion opportunity, and wherein the at least one advertisement insertion opportunity has an advertisement insertion opportunity bit rate;

selecting a digitally compressed advertisement for insertion into the digitally multiplexed video signal, wherein the digitally compressed advertisement has a minimum acceptable bit rate;

determining if the minimum acceptable bit rate is greater than or less than the advertisement insertion opportunity bit rate; and inserting the digitally compressed advertisement when the minimum acceptable bit rate is less than the advertisement insertion opportunity bit rate.

30. The method of claim 29, further comprising halting the insertion of the digitally compressed advertisement when the minimum acceptable bit rate is greater than the advertisement insertion opportunity bit rate.

31. An apparatus for controlling insertion of advertisements into a digitally multiplexed video stream, the apparatus comprising:

a receiver for receiving a digitally multiplexed video signal containing a plurality of digital program streams, wherein the program streams have a time varying bit rate and at least one advertisement insertion opportunity, and wherein the at least one advertisement insertion opportunity has an advertisement insertion opportunity bit rate;

an advertisement spooler for selecting a digitally compressed advertisement for insertion into the digitally multiplexed video signal, wherein the digitally compressed advertisement has a minimum acceptable bit rate; and a statistical multiplexer for determining if the minimum acceptable bit rate is greater than or less than the advertisement insertion opportunity bit rate and inserting the digitally compressed advertisement when the minimum acceptable bit rate is less than the advertisement insertion opportunity bit rate.

32. The apparatus of claim 31, wherein said statistical multiplexer halts the insertion of the digitally compressed advertisement when the minimum acceptable bit rate is greater than the advertisement insertion opportunity bit rate.

33. The apparatus of claim 31, wherein said statistical multiplexer is coupled to said advertisement spooler and said video source.

\* \* \* \* \*

UNITED STATES PATENT AND TRADEMARK OFFICE
CERTIFICATE OF CORRECTION

| | |
|---|---|
| PATENT NO. | : 6,704,930 B1 |
| APPLICATION NO. | : 09/553099 |
| DATED | : March 9, 2004 |
| INVENTOR(S) | : Charles A. Eldering et al. |

It is certified that error appears in the above-identified patent and that said Letters Patent is hereby corrected as shown below:

1. Column 11, line 2-3, delete "plesiouchronous" and replace with --plesiochronous--;

Signed and Sealed this

Twenty-seventh Day of February, 2007

JON W. DUDAS
*Director of the United States Patent and Trademark Office*